(12) United States Patent
Iwasawa

(10) Patent No.: US 6,496,495 B2
(45) Date of Patent: *Dec. 17, 2002

(54) CELLULAR COMMUNICATION SYSTEM

(75) Inventor: Kazunori Iwasawa, Saitama (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,930

(22) Filed: Jul. 8, 1998

(65) Prior Publication Data

US 2002/0057656 A1 May 16, 2002

(30) Foreign Application Priority Data

Jul. 9, 1997 (JP) .............................................. 9-184173

(51) Int. Cl.[7] .............................. H04B 7/212; H04B 3/00
(52) U.S. Cl. ....................................... 370/337; 370/347
(58) Field of Search ................................ 370/328, 329, 370/336, 337, 347, 442, 468, 443, 449, 444, 458, 461, 348, 349, 350, 338, 498

(56) References Cited

U.S. PATENT DOCUMENTS

| 5,551,056 A | * | 8/1996 | Koponen et al. ............... 455/8 |
| 5,715,245 A | * | 2/1998 | Suonvieri ................... 370/337 |
| 5,748,624 A | * | 5/1998 | Kondo ....................... 370/337 |

* cited by examiner

Primary Examiner—Chau Nguyen
Assistant Examiner—Soon-Dong Hyun
(74) Attorney, Agent, or Firm—Foley & Lardner

(57) ABSTRACT

Disclosed is a cellular communication system in which each of terminals communicates with a host device through one of subordinate devices of which the terminal is placed in the service area, wherein the host device and the subordinate devices are connected in series through dedicated lines, the host device determines the channel capacities and corresponding counts of time slots for the subordinate devices in accordance with the traffics of the subordinate devices, the channel capacities are transmitted from the host device to the subordinate devices through prescribed time slots of the dedicated lines, and the subordinate devices communicate with the host device in the time slots determined by the channel capacities.

6 Claims, 2 Drawing Sheets

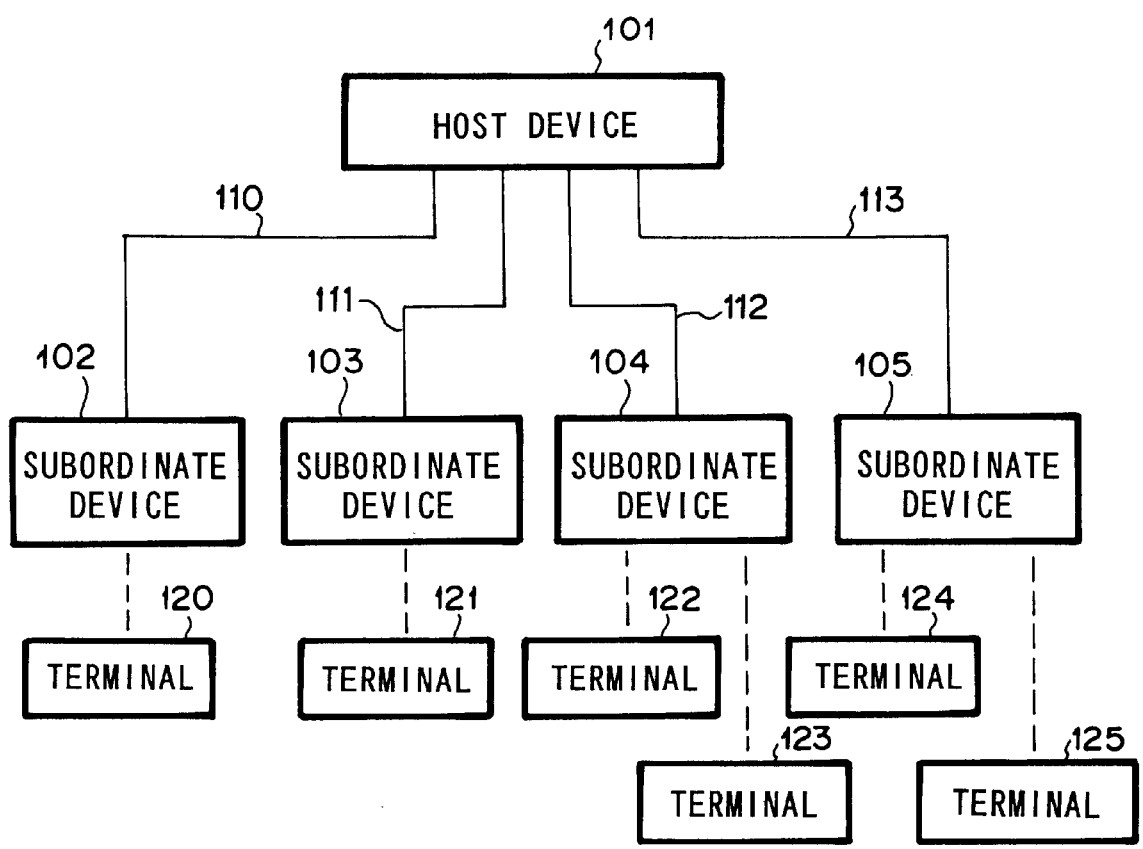

CELLULAR COMMUNICATION SYSTEM

BACKGROUND OF THE INVENTION

1, Field of the Invention

The present invention relates to a cellular communication system which comprises a host device, plural subordinate devices, and plural terminals and particularly, to the cellular communication system in which each terminal communicates with the host device through the subordinate device of which the terminal is placed in the service area.

2. Description of the Prior Art

FIG. 3 shows a block diagram showing a conventional cellular communication system. In FIG. 3, reference numeral 101 represents a host device which has four interfaces for communicating with subordinate devices. Reference numerals 102, 103, 104, and 105 represent subordinate devices which are connected with host device 101 through dedicated lines 110, 111, 112 and 113 in a star configuration, respectively. Reference numerals 120 to 125 represent terminals which communicate with host device 101 through subordinate devices 102 to 105.

The cellular communication system is one of data relay systems. In the cellular communication system, host device 101 dynamically assigns one of subordinate devices 102 to 105 to each of terminals 120 to 125 in order to keep communication quality best. For example, host device 101 gives terminal 120 the instruction to communicate through subordinate device 102 when terminal 120 is placed in the service area of subordinate device 102. Host device 101 gives terminal 121 to 125 the similar instructions. Terminals 120 to 125 move across service areas of subordinate devices 102 to 105. Therefore, the number of terminals which are in the service area of each of subordinate devices 102 to 105 fluctuates or the traffic of each of subordinate devices 102 to 105 fluctuates with the lapse of time. Moreover, the numbers of terminals which are in the service areas of subordinate devices 102 to 105 and, therefore, the traffics thereof, are uneven if subordinate devices 102 to 105 are not located at regular intervals. Consequently, the channel capacities of dedicated lines 110 to 113 were determined by the maximum number of terminals which gather in their respective service areas. Heretofore, dedicated lines 110 to 113 had the fixed channel capacities which were determined in such a way.

However, because the channel capacities of dedicated lines 110 to 113 were fixed while the traffics which pass through subordinate devices 102 to 105 are variable, unused channels or unused time slots increased when the traffics decreased. Thus, the channel capacities of dedicated lines 110 to 113 were not used effectively.

SUMMARY OF THE INVENTION

In order to overcome the aforementioned disadvantages, the present invention has been made.

An object of the present invention is to provide a cellular communication system in which a host device flexibly changes the channel capacities of lines in accordance with the traffics of subordinate devices, whereby the channel capacities of lines are effectively used even when the system is used under the condition that the traffics fluctuate or are uneven.

According to the invention, there is provided a cellular communication system in which each of terminals communicates with a host device through one of subordinate devices of which the terminal is placed in the service area, wherein the host device and the subordinate devices are connected in series through dedicated lines, the host device determines the channel capacities and corresponding counts of time slots for the subordinate devices in accordance with the traffics of the subordinate devices, the counts of time slots are transmitted from the host device to the subordinate devices through prescribed time slots of the dedicated lines, and the subordinate devices communicate with the host device in the time slots determined by the counts of time slots.

In the above cellular communication system, each subordinate device communicates with the host device in the time slots of the determined count starting from the time slot following the last time slot for the preceding subordinate device.

In the above cellular communication system, the host device determines the counts so that the total of the counts does not exceed the counts of time slots in a frame minus the counts of preoccupied time slots.

These and other objects, features and advantages of the present invention will become more apparent in light of the following detailed description of the preferred mode embodiment thereof, as illustrated in the accompanying drawings.

BRIEF DESCRIPTION OF THE DRAWINGS

FIG. 3 is a schematic diagram showing a cellular communication system in the prior art.

DETAILED DESCRIPTION OF THE PREFERRED EMBODIMENT

A preferred embodiment according to the present invention will be explained with reference to the accompanying drawings.

Figure 1:
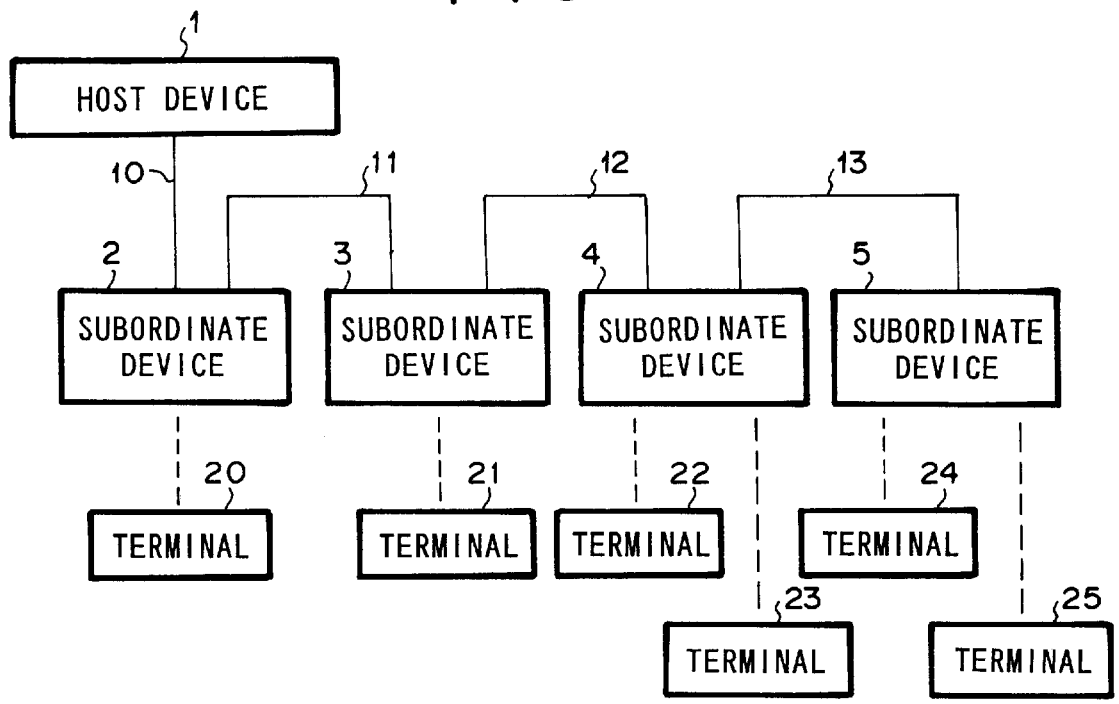
FIG. 1 is a diagram showing the cellular communication system according to one embodiment of the present invention.

In FIG. 1, reference numeral 1 represents a host device, reference numerals 2 to 5 represent subordinate devices, reference numerals 10 to 13 represent dedicated lines, and reference numerals 20 to 25 represent terminals. Host device 1 assigns time slots in a super frame shown in FIG. 2 to dedicated lines 10 to 13 in accordance with traffics of subordinate devices 2 to 5. Subordinate devices 2 to 5 acknowledge the number of time slots assigned thereto and use the assigned time slots. Terminals 20 to 25 communicate with host device 1 through subordinate devices 2 to 5. Host device 1 and subordinate devices 2 to 5 are connected one another in series through dedicated lines 10 to 13.

Figure 2:
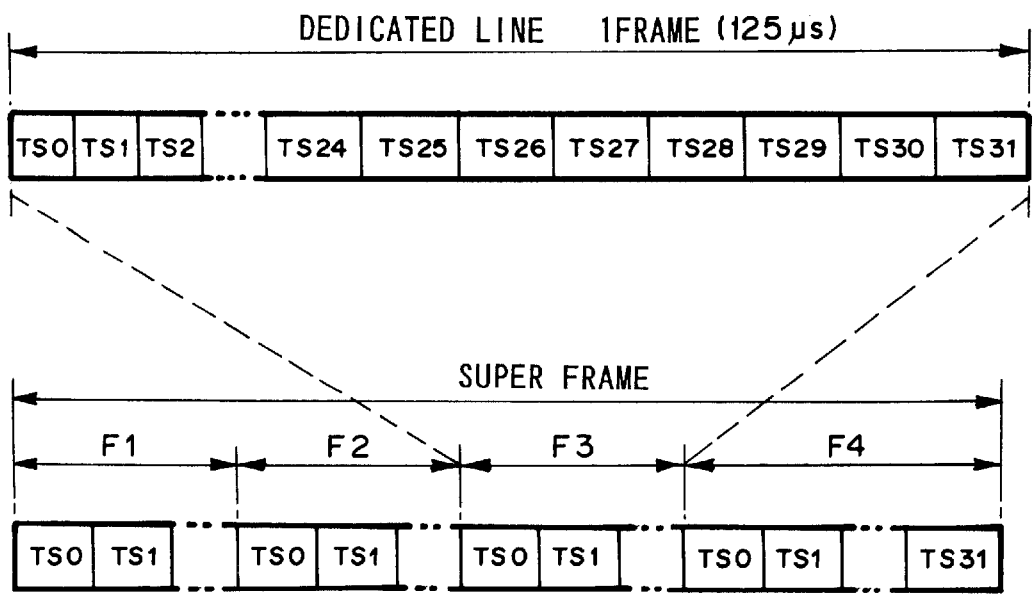
FIG. 2 is a diagram showing the structure of a super frame used in the above embodiment.

In FIG. 2, a super frame consists of four frames F1 to F4. The number of frames in a super frame is the same as the number of dedicated lines or the number of subordinate devices. Each frame consists of 32 time slots. Among time slots, first time slot TSO is used for synchronization, second time slot TS1 contains the number of time slots which is assigned to each of subordinate devices 2 to 5, the other time slots TS2 to TS31 are assigned for data.

Next, the operation of the embodiment will be explained.

Host device 1 determines the numbers of time slots assigned to subordinate devices 2 to 5 in consideration of traffics thereof. Host device 1 also determines the total of time slots in a frame assigned to subordinate devices 2 to 5. In this case, the total is, for example, 30. Then, host device 1 inserts the thus determined number of time slots to time slots TS1s of frames F1 to F4 for subordinate devices 2 to 5, respectively.

In more detail, host device 1 inserts the number of time slots assigned to subordinate device 2 which is determined by the traffic of subordinate device 2 to time slot TS1 of first frame F1. Similarly, host device 1 inserts the number of time slots assigned to subordinate device 3 which is determined by the traffic of subordinate device 3 to time slot TS1 of second frame F2, and so forth. Host device 1 also controls the total of slots assigned to subordinate devices 2 to 5 so that the total does not exceed the number of time slots in a frame minus two.

Next, a downward line will be explained. Host device 1 inserts data for subordinate devices 2 to 5 to time slots TS2 to TS31 on the downward line in the order of subordinate devices 2 to 5 while keeping the number of time slots assigned to each of subordinate devices 2 to 5 equal to the number of time slots inserted in time slot TS1. Subordinate device 2 receives TS1 in frame F1 in order to recognize the count of time slots assigned thereto, and then receives time slots of the count from frame TS2. Subordinate device 3 receives TS1 in frame F2 in order to recognize the count of time slots assigned thereto, and then receives time slots of the count from the time slot following the last time slot for subordinate device 2. Subordinate devices 4 and 5 receive them similarly. In the next super frame, host device 1 determines the numbers of time slots assigned to subordinate devices 2 to 5 and inserts the numbers to four time slots TS1s again.

Next, an upward line will be explained. Subordinate device 2 inserts the count assigned thereto to time slot TS1 of frame F1 and inserts data of the count to time slots TS2 et seq. of frame F2. Subordinate device 3 inserts the count assigned thereto to time slot TS1 of frame F2 and inserts data of the count to the time slots following the last time slot for subordinate device 2 of frame F3. Subordinate devices 4 and 5 insert them similarly. In the next super frame, subordinate devices 2 to recognize the counts in four time slots TS1s on the downward line and insert the counts to four time slots TS1s on the upward line and data into time slots TS3 to TS31 on the upward line.

As explained above, according to the present invention, because the host device and the subordinate devices are connected in series through the dedicated lines and they use the super frame, the connection between the host device and the subordinate devices can be simplified and the channel capacity for each subordinate device can be changed every super frame. Moreover, all the host device has to do is to insert the numbers of time slots assigned to the subordinate devices to the prescribed time slots in accordance with the traffics of the subordinate devices, whereby control is simplified. Further, the number of the subordinate devices may be changed by adjusting the number of time slots in the frame and the number of frames in the super frame.

Although the present invention has been shown and explained with respect to the preferred mode embodiment thereof, it should be understood by those skilled in the art that the foregoing and various other changes, omissions, and additions in the form and detail thereof may be made therein without departing from the spirit and scope of the present invention.

What is claimed is:

1. A cellular communication system in which each of terminals communicates with a host device through one of subordinate devices of which said terminal is placed in a service area, wherein said host device and said subordinate devices are connected in series through dedicated lines, and wherein said host device communicates with said subordinate devices using a super frame, the super frame comprising a plurality of frames equivalent to the number of subordinate devices, each of the subordinate devices having a corresponding frame in the super frame, each of the plurality of frames comprising a plurality of time slots, a variable number of time slots allocated for communicating data as data time slots, wherein the host device determines channel capacities and a corresponding number of the data time slots for the plurality of subordinate devices in accordance with an amount of traffic occurring at each subordinate device, the number of data time slots for a given subordinate device being transmitted from the host device to the given subordinate device only through a prescribed time slot in the corresponding frame of the given subordinate device, and the plurality of subordinate devices communicating with the host device in the corresponding number of data time slots.

2. The cellular communication system as set forth in claim 1, wherein each subordinate device communicates with said host device in the time slots of said determined count starting from the time slot following the last time slot for the preceding subordinate device.

3. The cellular communication system as set forth in claim 1, wherein said host device determines said number so that the total of said number does not exceed a number of time slots in a frame minus a number of preoccupied time slots.

4. A cellular communication system comprising
a host device;
a plurality of subordinate devices connected in series to the host device;
a plurality of terminals placed in a service area, the terminals communicating with the host device through one of the plurality of subordinate devices; and
a super frame for communicating information between the host device and the plurality of subordinate devices, the super frame comprising a plurality of frames equivalent to the number of subordinate devices, each of the subordinate devices having a corresponding frame in the super frame, each of the plurality of frames comprising a plurality of time slots, a variable number of time slots allocated for communicating data as data time slots,
wherein the host device determines channel capacities and a corresponding number of the data time slots for the plurality of subordinate devices in accordance with an amount of traffic occurring at each subordinate device, the number of data time slots for a given subordinate device being transmitted from the host device to the given subordinate device only through a prescribed time slot in the corresponding frame of the given subordinate device, and the plurality of subordinate devices communicating with the host device in the corresponding number of data time slots.

5. The cellular communication system of claim 4, wherein each subordinate device communicates with the host device using the time slots immediately following the last time slot used by the preceding subordinate device.

6. The cellular communication system of claim 4, wherein the host device determines the number of time slots such that the total number does not exceed the number of time slots in a frame minus the number of preoccupied time slots.

* * * * *